Sept. 1, 1953 G. J. KNUDSON 2,650,866
BEARING
Filed Dec. 22, 1949

INVENTOR.
Giltner J. Knudson
BY
Dale A. Bauer
ATTORNEY

Patented Sept. 1, 1953

2,650,866

UNITED STATES PATENT OFFICE 2,650,866

BEARING

Giltner J. Knudson, Guilford, N. Y., assignor to Bendix Aviation Corporation, New York, N. Y., a corporation of Delaware Application December 22, 1949, Serial No. 134,550

17 Claims. (Cl. 308—236)

This invention relates to bearings and more particularly to mounting means for bearings adapted for supporting rotating parts.

In many installations using anti-friction bearings, such as roller or ball bearings, it has been found highly advantageous and in some cases necessary to so mount the same that one or both of the races thereof are free to move axially relative to their supports. This is done for various reasons, such as to prevent pre-loading of the bearings by expansion or contraction of associated parts during operation, and to compensate for manufacturing tolerances or the like. However, this introduces the difficulty that a part of the bearing that is sufficiently free to move axially relative to its support may also be caused to rotate or roll during shaft rotation and, hence, to heat up or wear rapidly to such an extent as to cause failure or improper operation. Under some conditions, a bearing member designed to float may become seized in or on its support and result in undesirable or fatal pre-loading of the bearings.

One of the objects of the present invention is to provide means novelly associated with a bearing and its supports for overcoming the foregoing difficulties arising from present practice.

Another object of the invention is to provide novel means for mounting the race of an anti-friction bearing including means adapted to satisfactorily restrain rolling or rotary motion of the race without unduly restraining relative axial movement of the race and its support.

Still another object is to provide means of the above character which is novelly constructed and suitably installed to accomplish the above results while permitting sufficient clearances to obviate the danger of a bearing race becoming seized during normal operation.

A further object is to provide means of the above character which are novelly constructed in such a manner as to be durable and reliable as well as easy to install and replace.

Still another object is to provide a novel device of simple construction involving only a small number of inexpensive elements which is adapted to be readily operatively associated with bearings of standard design for attaining the foregoing advantages.

The above and further objects and novel features of the present invention will more fully appear from the following detailed description when the same is read in connection with the accompanying drawings. It is to be expressly understood, however, that the drawings are for the purpose of illustration only and are not intended to define the limits of the invention.

In the drawings, wherein like reference characters refer to like parts throughout the several views, Fig. 1 is a sectional side elevation of one form of apparatus embodying the present invention, the section being taken substantially on line 1—1 of Fig. 2;

The invention is illustrated in the accompanying drawings, by way of example, in the form of a ball bearing and its external supporting means for journalling a shaft or other rotating part. However, the novel features of the invention are adaptable to all types of roller bearings and to plain bearings. The particular form of the invention depicted is shown separately in its adaptations to the inner and outer races of a bearing, but the same may be applied to both the inner and outer races of the same bearing.

Figure 1:
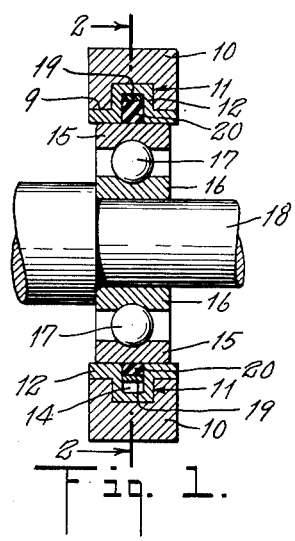
Figure 2:
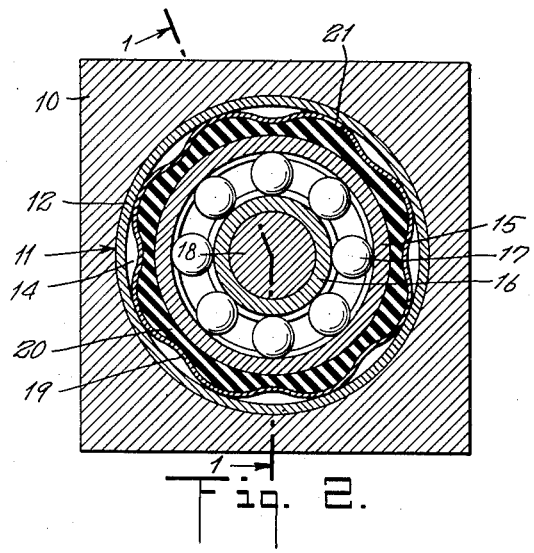
Fig. 2 is a sectional end elevation of the apparatus of Fig. 1, the section being taken substantially on line 2—2 of Fig. 1.

In Figs. 1 and 2 the support 10 for the bearing, such as the frame of a machine, is shown diagrammatically with a circular opening 9 and an annular internal groove 11 within the opening. A liner 12 may be provided in opening 9 and groove 11. The liner is optional but when provided, has an annular groove 14 which is preferably, though not necessarily, rectangular in transverse cross section.

The bearing proper may be of conventional design and as shown, comprises an outer ring or race 15, an inner ring or race 16, and a plurality of balls or rollers 17 interposed therebetween. The latter ride in suitable grooves on the inner and outer surfaces of the outer and inner races, respectively. Inner race 16 is shown as being mounted on and supporting a rotating part or shaft 18. One end of race 16 engages a shoulder on the shaft and suitable means, such as a nut (not shown), may be provided on the shaft for preventing relative axial movement of race 16 and the shaft, although this is not necessary. The outer race 15 of the bearing has a sliding fit within lining 12 or within opening 9 if a liner is not used and is free to move axially with the rest of the bearing relative to the support 10, 12. It will of course be understood that the internal member 18 may serve as a stationary support for an external part 10 which rotates.

Novel means are provided for restraining bearing race 15 against undue rolling or rotation in support 10, 12 during rotation of shaft 18 without unduly restraining movement of said race in an axial direction within the support. If, for example, the shaft expands longitudinally during operation and thereby moves inner race 16 to the right, as viewed in the drawings, it is highly desirable that outer race 15 be free to move in the same direction to avoid any wedging or pre-loading of the balls 17 between the two races. In the form shown, said means comprises a wavy ribbon-type spring 19 bent or formed to a generally cylindrical shape and permitted to expand into engagement with the inner or bottom wall of groove 14, or groove 11 if the liner is not used. When thus installed the ends of the spring are separated a short distance, as at 21, to permit longitudinal extension thereof when radial pressure is applied to its inner surface, tending to flatten out the waves, humps or similar irregularities.

Mounted within spring 19 and having approximately the same axial width is a yieldable ring 20 of pure or synthetic rubber or other suitable yieldable or resilient material. The outer periphery of ring 20 is preferably, but not necessarily, shaped to conform substantially to the inner surface of spring 19 when it is in position in groove 14. The inner periphery of said ring is preferably circular and has a diameter slightly less than the outer diameter of outer bearing race 15. Thus, when the bearing is installed ring 20 is expanded into groove 14 and exerts a radial pressure outwardly against spring 19. Because the material of ring 20 is substantially incompressible, the pressure created by the expansion thereof is exerted against the spring and tends to flatten the latter, thereby biasing it to exert a continuous radial pressure inwardly against the yieldable ring through which the pressure is transmitted to the outer bearing race 15. The pressure thus applied to race 15 is substantially uniform around the entire periphery thereof by reason of the ability of the material of ring 20 to flow under pressure and distribute the latter evenly over the resilient surface. Ring 20 thus tends to maintain the bearing in a central position, to thereby prevent any rolling of race 15 after the fashion of an internal gear. Additionally, the frictional engagement between the ring and the race restrains the latter from rotating or rolling without unduly restraining the axial movement of the race.

Although the relative dimensions of the parts will vary with different materials in order to assure best results, these will not be difficult to determine. In one practical embodiment having an outer bearing race with a diameter of 1½ inches, the initial or normal inner diameter of the ring 20 when made of synthetic rubber is .060 inch less. The excess volume of the material of ring 20 which is displaced when the race 15 is installed should of course be less than the free volume or space behind spring 19. Rotational movement of spring 19 and ring 20 within groove 14 is prevented by the frictional engagement of the spring with the bottom of the groove and of ring 20 with the side walls of the groove when said spring and ring are placed under compression by installation of the bearing. If desired, the spring could be positively anchored at some point within the groove.

A suitable bevelled tool 22 may be used to compress ring 20 and spring 19 within groove 14 to facilitate the installation of the bearing in support 10, 12.

Figure 3:
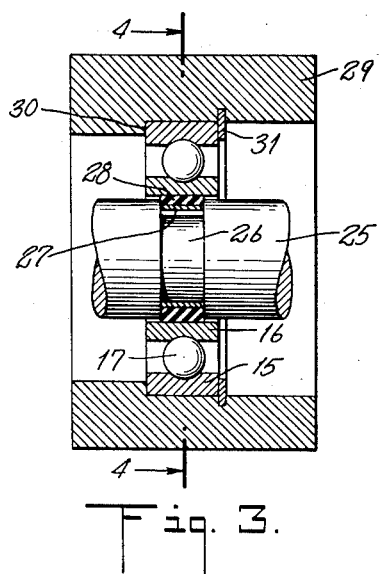
Fig. 3 is a view similar to Fig. 1 of a modified form of the invention, the section being taken on line 3—3 of Fig. 4.
Figure 4:
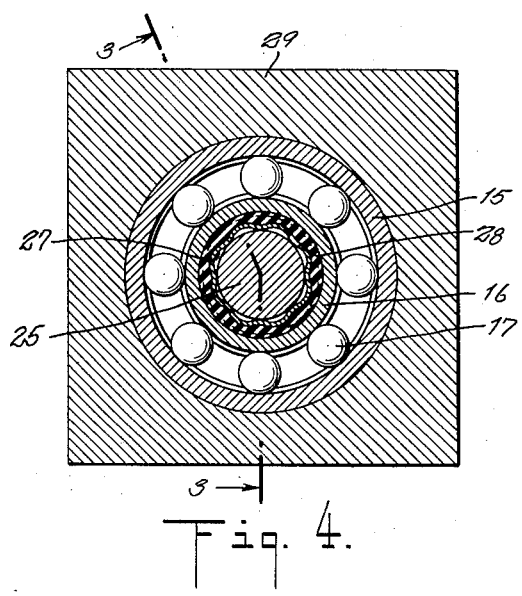
Fig. 4 is a sectional end elevation of the device of Fig. 3, the section being taken substantially on line 4—4.

In Figs. 3 and 4 there is shown an embodiment of the invention wherein the inner race 16 of the bearing is mounted to float axially relative to the inner rotating shaft or supporting member 25. The latter has an annular or circumferential groove 26 therein for receiving a wavy leaf spring 27 and a yieldable ring 28 corresponding respectively to spring 19 and ring 20 of Fig. 1. These elements are placed under compression by the installation of the bearing and the latter is thereby centered relative to the shaft and frictionally held against undue rotational movement relative to the shaft without being unduly restrained against relative axial movement. The outer race 15 in the embodiment of Fig. 3 is fixedly mounted in a support 29 by means of a shoulder 30 and a snap ring 31 or in any other suitable known manner.

In Fig. 3 a relatively substantial clearance is shown between shaft 25 and bearing race 16. This is done to more clearly illustrate how the device of the present invention will compensate for manufacturing tolerances in clearances of this character. Axial tolerances are compensated for by axial floating of one or both races of the bearing.

Figure 5:
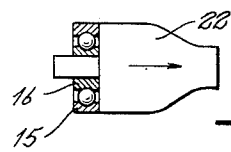
Fig. 5 is a side view, on a reduced scale, of a suitable tool for installing the bearing of Fig. 1.

For installing the bearing on shaft 25 a suitable tool may be provided for first compressing spring 27 and ring 28 in groove 26. Such tool may be similar to that shown in Fig. 5 but having an internal bevelled surface to effect the compression when it is moved axially over the shaft.

Although only a limited number of embodiments of the invention are illustrated in the drawings and described in the foregoing specification, it is to be expressly understood that the same is not limited to the specific details of construction thus shown and described. For example, the spring which backs up the yieldable ring may be of a specifically different shape, such as being bowed transversely to flatten in a transverse direction when pressure is applied or even tubular. By the same token the specific shape of the groove in the supporting or rotating member might be varied. In some installations it might be advantageous to roughen or provide ribs on one or both of the engaging surfaces of the bearing and yieldable ring. If desired, the spring and yieldable ring may be mounted in grooves in the bearing races to frictionally engage the supporting or rotating part. Various changes may be made in the design and arrangement of parts illustrated as well as in the materials suggested without departing from the spirit and scope of the invention as the same will now be understood by those skilled in the art.

What is claimed is:

1. In combination, a supporting member having a bearing receiving opening and an annular groove formed in the circumferential wall of said opening, a bearing positioned in said opening, an annular ring of resilient material, such as rubber, closely surrounding and frictionally engaging said bearing and extending into said groove, and biased resilient means in said groove around said ring for maintaining the latter under radial compression between said bearing and said resilient means.

2. In combination, a member having a cylindrical portion for receiving a bearing and an annular groove formed in the surface thereof, a bearing having a close running fit on said member around said groove, an annular ring of resilient material, such as rubber, in said groove and circumferentially engaging the inner periphery of said bearing, and biased resilient means in said groove within said ring for maintaining the latter under radial compression between said bearing and said resilient means.

3. In combination, a member having an annular surface for receiving a bearing and an annular groove formed in said surface, a bearing positioned concentrically with and in the plane of said groove, an annular ring of resilient material, such as rubber, in said groove and extending into frictional engagement with an annular surface of a part of said bearing, and a biased wavy leaf spring seated against the bottom of said groove for maintaining said ring under substantially uniform compression against said annular surface.

4. In combination, a supporting member, a bearing having a member supported by said supporting member, and means for resisting relative rotation of said members including a ring of substantially incompressible resilient material, such as solid rubber, in a groove in one of said members and projecting into frictional engagement with an annular surface of the other member and resilient means under compression in said groove for maintaining said ring under compression against said annular surface, said resilient means consisting of a wavy leaf spring and the surface of said ring engaged by the spring having substantially the same conformation as the spring.

5. In apparatus of the class described, a member having an annular groove therein, a ring of resilient material mounted in said groove and having an annular portion projecting therefrom, and resilient means seated against the bottom of said groove beneath the ring and adapted to be placed under compression when the projecting portion of said ring is pressed into the groove, said ring filling the entire space in said groove above said resilient means.

6. A brake for a bearing race comprising a ring of yieldable material having one cylindrical peripheral surface and one wavy peripheral surface, and a leaf spring engaging and bent to conform to said wavy surface, the ends of said spring being normally spaced apart a short distance.

7. In apparatus of the class described, two members relatively rotatable about a common axis, an anti-friction bearing interposed between said members and comprising a part axially movable relative to at least one of said members, a ring of substantially incompressible resilient material closely engaging an annular surface of said part, and a metallic wavy leaf spring interposed between said ring and said one member for exerting a yielding pressure to press said ring against said part, said spring and ring being substantially confined in an annular groove in the other member with the spring seated against the bottom of the groove.

8. In apparatus of the class described, an annular member, a supporting member therefor, and means for resisting relative rotational movement of said members, said means comprising a ring of substantially incompressible rubber mounted in an annular groove in one of said members and projecting therefrom into frictional engagement with an annular surface of the other of said members and biased resilient means seated against the bottom of said groove beneath said ring for maintaining said ring under compression toward said annular surface, said resilient means comprising a wavy leaf spring and the surface of said ring engaged by said spring having substantially the same conformation as the spring.

9. Apparatus as defined in claim 8 wherein the annular member is the race of a roller bearing.

10. Apparatus as defined in claim 9 wherein the groove is in the supporting member which surrounds the bearing race.

11. Apparatus as defined in claim 9 wherein the groove is in the supporting member which is surrounded by the bearing race.

12. A bearing structure including concentric, relatively movable parts, an interposed bearing with a race movable with respect to one said part, and a bearing brake including a resilient annulus frictionally engaged with the movable race, radially acting circumferential spring means consisting of a biased wavy spring engaging a conforming wavy surface on the annulus for forcing the annulus into engagement with the race, and means confining the annulus against expansion transverse to the direction of action of the spring means.

13. In apparatus of the class described, a support having a bearing receiving opening, a circumferential groove having a cylindrical bottom surface in the wall of said opening, a bearing having a sliding clearance in said opening, and braking means for resisting rotary movement of said bearing in said support comprising a wavy leaf spring in said groove having the crests of its external waves seated against the cylindrical bottom surface of said groove and its ends spaced a short distance apart and a ring of resilient material, such as rubber, surrounding and yieldably gripping the external surface of said bearing and interposed under compression between said bearing and spring, said ring having an external wavy surface engaging and conformed to the entire inner surface of said spring, an internal cylindrical surface engaging said bearing and opposed side surfaces in frictional engagement with the side walls of said groove.

14. In apparatus of the class described, support means comprising a member having a cylindrical surface, a bearing comprising a member having a cylindrical surface, said surfaces being concentric and having only a small clearance therebetween to permit relative axial movement thereof, a circumferential groove in one of said members, and frictional braking means for resisting relative angular movement of said members about the axis of said surfaces, said braking means comprising a wavy leaf spring in and having a width comparable to the width of said groove, the crests of the waves of said spring being seated against the bottom of said groove and the ends thereof being normally spaced a short distance apart, and a ring of substantially incompressible resilient material, such as rubber, interposed under radial compression between said spring and the cylindrical surface of the other of said members, said ring having an annular wavy surface engaging and conformed to a surface of said spring, a cylindrical surface engaging said other member and opposed side surfaces frictionally engaging the side walls of said groove.

15. Apparatus as defined in claim 14 wherein the bearing is a roller bearing having inner and outer races and said bearing member is one of said races.

16. Apparatus as defined in claim 14 wherein said groove is in said support means member and surrounds said bearing member.

17. Apparatus as defined in claim 14 wherein said support means member is a rotatable shaft and said groove is in the shaft and surrounded by said bearing member.

GILTNER J. KNUDSON.

References Cited in the file of this patent

UNITED STATES PATENTS

| Number | Name | Date |
|---|---|---|
| 1,510,303 | Bugatti | Sept. 30, 1924 |
| 1,708,484 | Nelson | Apr. 9, 1929 |
| 1,850,566 | Roed | Mar. 22, 1932 |
| 1,972,581 | Barker | Sept. 4, 1934 |
| 2,141,122 | Boden | Dec. 20, 1938 |
| 2,231,690 | Sheldrick et al. | Feb. 11, 1941 |
| 2,286,276 | Huddle | June 6, 1942 |
| 2,473,267 | Wightman | June 14, 1949 |

FOREIGN PATENTS

| Number | Country | Date |
|---|---|---|
| 4,409 | Great Britain | 1909 |
| 484,148 | Germany | Oct. 11, 1929 |
| 105,388 | Sweden | July 2, 1942 |